(12) United States Patent
Jang et al.

(10) Patent No.: US 7,887,948 B2
(45) Date of Patent: Feb. 15, 2011

(54) PACK TYPE BATTERY

(75) Inventors: Youngcheol Jang, Yongin-si (KR); Nohyun Kwag, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1 day.

(21) Appl. No.: 12/105,244

(22) Filed: Apr. 17, 2008

(65) Prior Publication Data

US 2008/0261087 A1 Oct. 23, 2008

(30) Foreign Application Priority Data

Apr. 19, 2007 (KR) .................. 10-2007-0038408

(51) Int. Cl.
*H01M 2/02* (2006.01)
*H01M 2/04* (2006.01)
*H01M 14/00* (2006.01)
(52) U.S. Cl. .................. 429/163; 429/167; 429/176; 429/7
(58) Field of Classification Search .................. None
See application file for complete search history.

(56) References Cited

U.S. PATENT DOCUMENTS 6,524,732 B1 * 2/2003 Iwaizono et al. .............. 429/7
2008/0096101 A1 * 4/2008 Kwag et al. .................. 429/121

FOREIGN PATENT DOCUMENTS

| KR | 1020010043946 | 5/2001 |
|---|---|---|
| KR | 10-2004-0057363 | 7/2004 |
| KR | 10-2004-0057365 | 7/2004 |
| KR | 10-2004-0085178 | 10/2004 |
| KR | 1020040108790 | * 10/2004 |
| KR | 10-2004-0110598 | 12/2004 |
| KR | 10-2006-0010482 | 2/2006 |
| KR | 10-20047-0035642 | 4/2007 |
| WO | WO 00/59064 | 10/2000 |

OTHER PUBLICATIONS

Korean Patent Abstracts, Publication No. 1020040057363 A; Date of Publication: Jul. 2, 2004; in the name of Cho.
Korean Patent Abstracts, Publication No. 1020040057365 A; Date of Publication: Jul. 2, 2004; in the name of Su Jin Han, et al.

(Continued)

*Primary Examiner*—Dah-Wei Yuan
*Assistant Examiner*—Angela J. Martin
(74) *Attorney, Agent, or Firm*—Christie, Parker & Hale, LLP

(57) ABSTRACT

A pack type battery includes a bare cell having a top edge, a bottom edge, and opposing side surfaces. A protective circuit module is electrically coupled to the bare cell by a lead plate. A substrate cover is attached to the bare cell and covers the protective circuit module. A pair of elongate cell covers are provided, each elongate cell cover including a base for covering an edge of the bare cell and a skirt extending from longitudinal edges of the base for covering a portion of the opposing side surfaces. A label covers the opposing side surfaces of the bare cell and the skirt of each elongate cell cover.

12 Claims, 7 Drawing Sheets

OTHER PUBLICATIONS

Korean Patent Abstracts, Publication No. 1020040085178 A; Date of Publication: Oct. 7, 2004; in the name of Katsumi Kozu, et al.

Korean Patent Abstracts, Publication No. 1020040110598 A; Date of Publication: Dec. 31, 2004; in the name of Jun Ho Kim.

Korean Patent Abstracts, Publication No. 1020060010482 A; Date of Publication: Feb. 2, 2006; in the name of Sang Won Lee.

Korean Patent Abstracts, Publication No. 1020070035642 A; Date of Publication: Apr. 2, 2007; in the name of Jun III Yoon, et al.

Korean Notice of Allowance dated Mar. 31, 2008 issued by the Korean Patent Office for corresponding Korean Patent Application No. 10-2007-0038408, listing the cited reference in this IDS.

* cited by examiner

PACK TYPE BATTERY

CROSS-REFERENCE TO RELATED APPLICATION

This application claims priority to and the benefit of Application Serial No. 10-2007-0038408, filed in the Korean Intellectual Property Office on Apr. 19, 2007, the entire content of which is incorporated herein by reference.

BACKGROUND

1. Field of the Invention

The present invention relates to a secondary battery, and more particularly, to a pack type battery having an improved covering.

2. Description of the Prior Art

Exemplary secondary batteries, also known as rechargeable batteries, may include nickel-hydrogen (Ni-MH) batteries or lithium ion batteries, classified according to their electrode active materials. Exemplary lithium ion batteries are liquid electrolyte batteries, solid polymer electrolyte batteries, and batteries using a gel phase electrolyte. Secondary batteries may be encased in various housings, such as a can or a pouch.

Lithium ion batteries have higher energy density per unit weight than primary, or non-rechargeable, batteries so relatively lightweight batteries can be manufactured. Additionally, lithium ion batteries are environmentally-friendly because heavy metals such as cadmium or mercury are not used, and such batteries can be charged and discharged more than 1000 times under normal conditions. Accordingly, lithium ion batteries have become highly developed with the development of recent information and communication technology.

Conventional lithium ion batteries are assembled by inserting an electrode assembly, including a wound positive electrode plate, negative electrode plate and separator, and electrolyte into a metal can, and sealing an opening of the can. Lithium ion batteries usually include an external electrode terminal insulated from the can. The electrode terminal serves as either a positive electrode or a negative electrode, and the can serves as the opposite electrode.

The secondary battery may malfunction due to a rapid voltage increase caused by an electrical short occurring by, an external impact on the battery or over-charge or over-discharge of the battery. Safety devices, such as a positive temperature coefficient (PTC) device, a thermal fuse, or a protection circuit module (PCM), may be coupled to the battery, thereby allowing the battery to be safely distributed and used in a pack.

Exemplary battery packs include hard pack batteries, typically having an integrally molded plastic resin housing, and inner pack batteries, wherein the housing is not separately molded and the batteries are primarily finished by a separate exterior decorating material such as a label. Inner pack batteries are sometimes less reliable because the label may detach from the inner pack battery. However, inner pack batteries are advantageous because they can be used regardless of shape and structure of an external device.

In one type of inner pack battery, a prismatic type can houses the electrode assembly. The PCM is installed on one side of the bare cell, and the PCM and the bare cell are coupled to a lead plate. A resin molding is used to cover the PCM and upper and lower surfaces of the bare cell.

The resin cover may include a skirt covering the upper and lower surfaces of the bare cell. The surface of the can and the skirt form a step on a side surface of the bare cell. The bare cell combined with the resin cover is then wrapped by the label. If the label is wrapped around the step, the label may be attached unevenly causing wrinkles that are not only aesthetically unappealing, but may also result in poor adhesion of the label. In some cases, insulating tape is attached to the side surface of the bare cell to compensate for the step. However, the use of insulation tape to compensate for the step increases manufacturing costs and manufacturing complexity.

SUMMARY

A pack type battery is provided including a bare cell having a top edge, a bottom edge, and opposing side surfaces. A protective circuit module is electrically coupled to the bare cell by a lead plate. A substrate cover is attached to the bare cell and covers the protective circuit module. A pair of elongate cell covers are provided, each elongate cell cover including a base for covering an edge of the bare cell and a skirt extending from longitudinal edges of the base for covering a portion of the opposing side surfaces. A label covers the opposing side surfaces of the bare cell and the skirt of each elongate cell cover.

In one exemplary embodiment, the skirt extends along only a portion of a length of the base of each elongate cell cover, and may be centrally located thereon. Further, each elongate cell cover may include a rib adapted to engage a rib groove on the substrate cover. An identifying mark may be located on the top edge of the bare cell to differentiate the top edge from the bottom edge.

DETAILED DESCRIPTION

Figure 1:
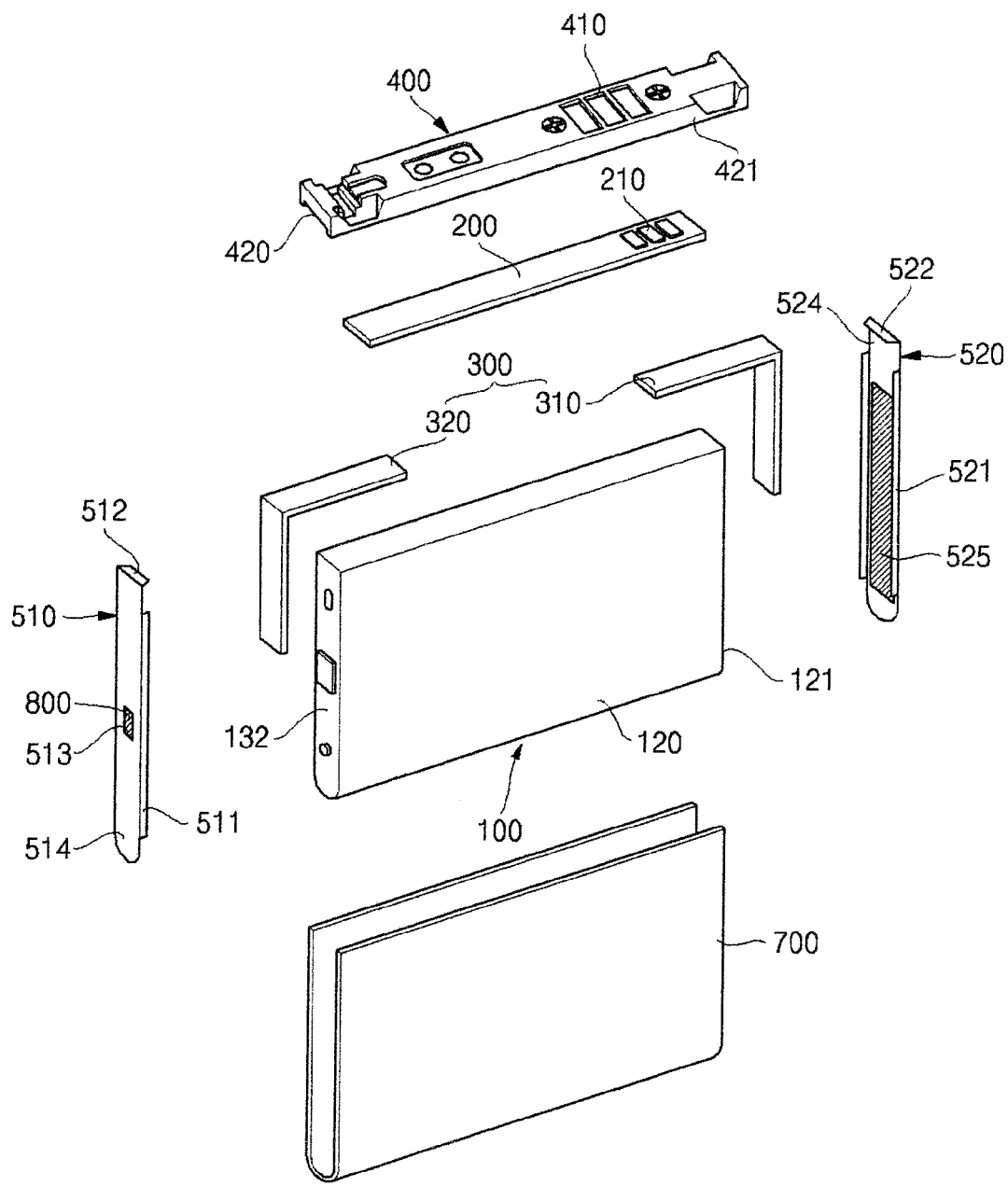
FIG. 1 is an exploded perspective view of a pack type battery according to an exemplary embodiment of the present invention.
Figure 4:
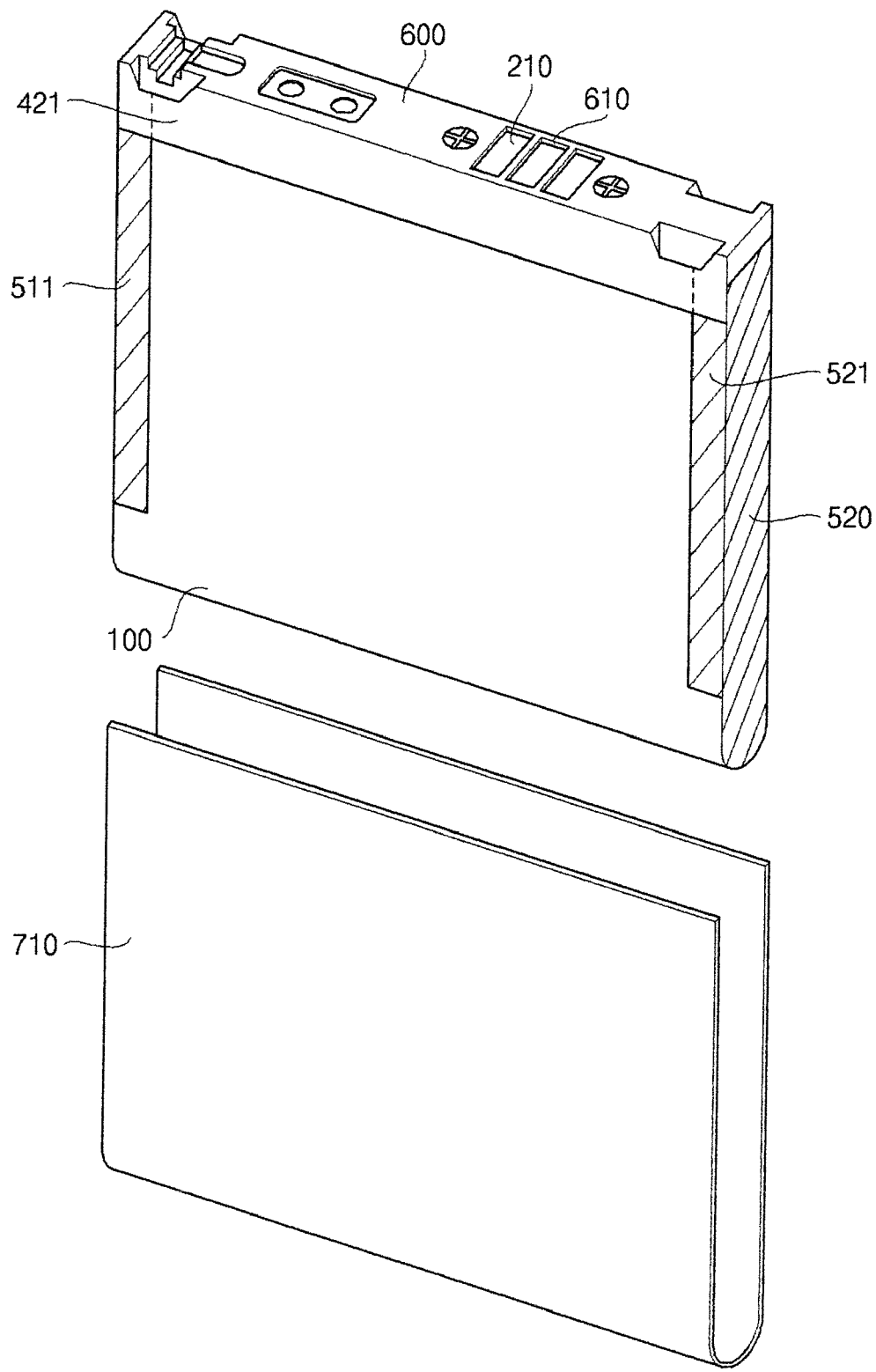
FIG. 4 is a perspective view of a pack type battery according to another exemplary embodiment of the present invention.

Referring to FIGS. 1 and 4, a pack battery generally includes a bare cell 100, a PCM 200 electrically coupled to the bare cell 100 by a lead plate 300, a substrate cover 400 and cell covers 510, 520.

In one exemplary embodiment, the bare cell 100 is a rectangular parallelepiped. The substrate cover 400 may be configured to fit over an edge of the bare cell 100 like a sleeve and may be adhered to the bare cell, such as by doubled-sided tape. The substrate cover 400 may be injection molded as a separate component and later combined with the bare cell as shown in FIG. 1. Hot melt resin may be used to fill in gaps between the bare cell and the substrate cover 400.

The PCM 200 and a portion of the lead plates 310, 320 are covered by the substrate cover 400. Cell covers 510, 520 cover a bottom 121 of a prismatic type can 120, a surface of a cap plate 132, and a portion of the lead plates 310, 320.

Figure 5:
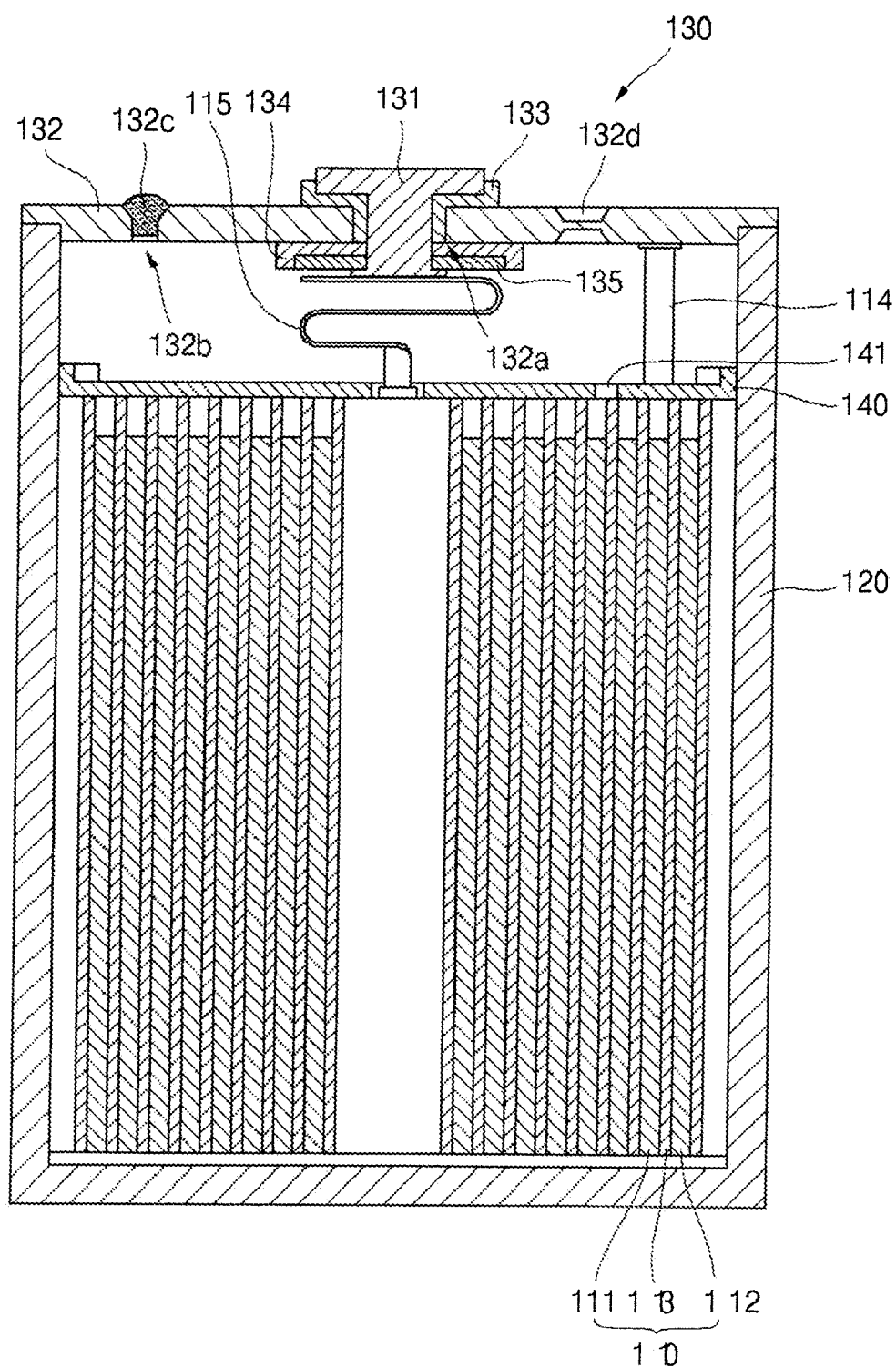
FIG. 5 is a longitudinal cross-sectional view of a conventional pack type battery.
Figure 5:
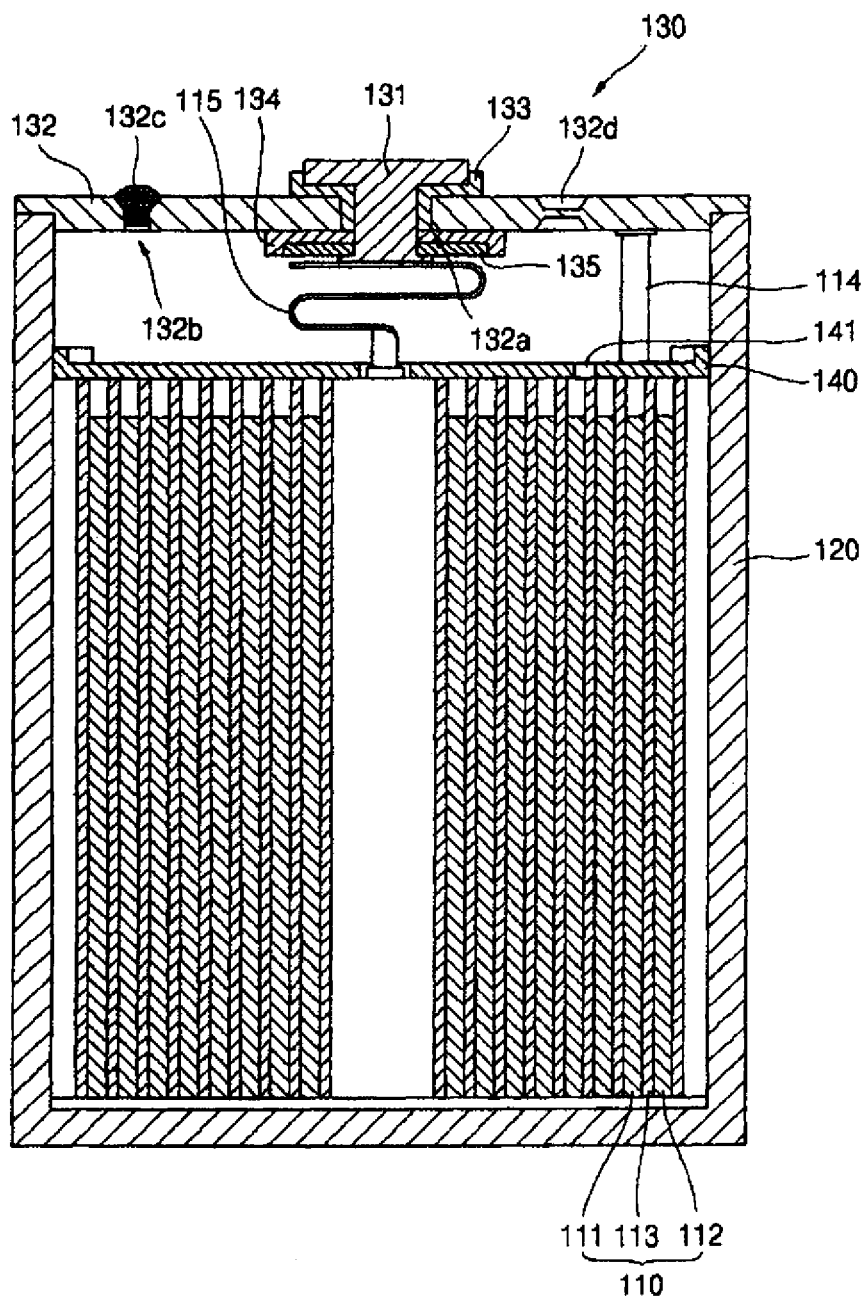

Referring now to FIG. 5, the bare cell 100 includes an electrode assembly 110, a can 120 for housing the electrode assembly 110 and an electrolyte, a cap assembly 130 sealing an upper opening of the can 120. The electrode assembly 110 includes a positive electrode plate 111, a negative electrode plate 112, and a separator 113 interposed between the positive electrode plate 111 and the negative electrode plate 112 as is generally known in the art.

The positive electrode plate 111 includes the positive electrode collector, the positive electrode coating portion, and a positive electrode tap 114. The positive electrode collector is composed of aluminum foil in a thin plate, and the positive electrode coating portion containing lithium group oxides as a main component is coated on both ends of the positive electrode collector. A positive electrode uncoated portion, on which the positive electrode coating portion is absent, is formed on both surfaces of the positive electrode collector. Lithium oxides, such as $LiCoO_2$, $LiMn_2O_4$, $LiNiO_2$, and $LiMnO_2$, etc. are used for the positive electrode coating portion.

The positive electrode tap 114 is fixed to an inner circumferential portion on the positive electrode uncoated portion when it is wound by ultrasonic welding or laser welding. The positive electrode tap 114 is composed of nickel, and protrudes toward an upper end of the positive electrode collector.

The negative electrode plate 112 includes a negative electrode collector, a negative electrode coating portion and a negative electrode tap 115. The negative electrode plate 112 includes a negative electrode collector, an negative electrode coating portion and an negative electrode tap.

The negative electrode collector is composed of copper foil in a thin plate, and the negative electrode coating portion containing carbon material as a main component is coated on both surfaces of the negative electrode collector. A negative electrode uncoated portion, where the negative electrode coating portion is absent, is located on both ends of the negative electrode collector. Carbon (C) group materials, silicon (Si), tin (Sn), tin oxide, composite tin alloys are used for the negative electrode coating portion.

The negative electrode tap 115 is composed of nickel, and fixed at both ends on an inner circumference of the negative electrode non-coating portion when it is wound by ultrasonic welding. The negative electrode tap 114 protrudes toward an upper end part of the negative electrode collector.

The separator 113 insulates the positive electrode plate 111 and the negative electrode plate 112, and is generally formed of polyethylene (PE) or polypropylene (PP). The separator 113 may include the electrolyte, and may be formed to be a liquid phase or a gel shape.

An insulating case 140 may electrically insulate the electrode assembly 110 from the cap assembly 130, the insulating case having a through-hole to allow the negative electrode tap to pass therethrough. Additionally, an electrolyte through-hole 141 may be located on the insulating case 140.

The cap assembly 130 includes a cap plate 132 for sealing an opening in the can 120. The cap plate 132 includes a terminal through-hole 132a and a gasket 133 electrical insulating an electrode terminal 131 from the cap plate 132. An insulating plate 134 is located on a bottom of the cap plate 132, and a terminal plate 135 is located on a bottom of the insulating plate 134.

An electrolyte injection hole 132b is located on one side of the cap plate 132, and a plug 132c is provided to seal the electrolyte injection hole 132b. The plug 132c is ball type material formed of aluminum or aluminum alloy. The plug 132c is placed on the electrolyte injection hole 132b and mechanically pressed in the electrolyte injection hole 132b. The plug 132c is welded to the cap plate 132 on the periphery of the electrolyte injection hole 132b to seal the electrolyte injection hole. A safety vent 132d is also located on the cap plate 132. If an interior pressure of the battery increases above a certain pressure, the safety vent 132d fractures to prevent explosion of the battery.

Referring again to FIG. 1, the PCM 200 may be located on a side edge of the bare cell 100. The PCM includes electrical elements mounted on a printed circuit board and a protecting circuit for preventing over-charge and over-discharge of the battery and improving electrical stability of the battery. In general, the PCM 200 manages all operations of the battery. Exterior terminals 210, e.g., a charge/discharge terminal and an inspecting terminal, connectable to external devices are installed on the PCM 200.

The lead plate 300 includes a positive electrode lead plate 310 and an negative electrode lead plate 320. The positive electrode lead plate 310 is connected to the PCM 200 and to a bottom of the can 120 of the bare cell 100. An insulator (not shown) is located between the negative electrode lead plate 320 and the bare cell 100 to insulate the negative electrode lead plate 320 from the bare cell 100. Additionally, a conventional safety device (not shown), such as a positive thermal coefficient (PTC) device, may be incorporated between the can 120 and the PCM as will be appreciated by of ordinary skill in the art.

The substrate cover 400 covers the PCM 200 and is attached to the bare cell 100. A sleeve 421 is included on the substrate cover 400 such that when the substrate cover is attached to the bare cell 100, the sleeve covers an outer surface of the bare cell 100, thereby providing additional safety from damage by impact of the battery. An outer terminal through-hole 410 is located on the substrate cover 400 to expose an exterior terminal 210 of the PCM 200 and to allow the exterior terminal to be connected to external devices.

The substrate cover 400 may be more securely attached to the bare cell 100 by increasing the coupling connection between the components with the use of an adhesive, for example, glue, tape, resinous material, or any other suitable material.

Elongate cell covers 510, 520 are injection molded and attached to the bare cell 100, specifically, a surface of the cap plate 132 and a bottom 121 of the can 120. In one exemplary embodiment, the cell covers 510, 520 are plates configured to cover the cap plate 132 and the bottom 121 of the can 120. The cell covers 510, 520 include a base 514, 524 and respective skirts 511, 521 extending from longitudinal edges of the base, the skirts adapted to rest on side surfaces of the bare cell 100.

Figure 2A:
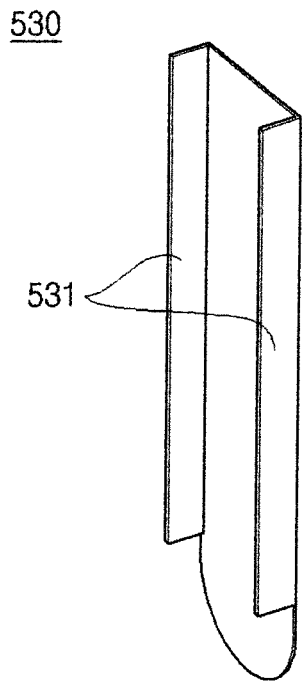
FIGS. 2a to 2d are perspective views of exemplary cell covers for a pack type battery according to the present invention.
Figure 2B:
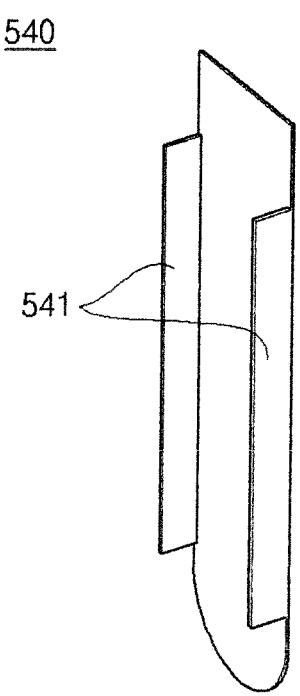
Figure 2C:
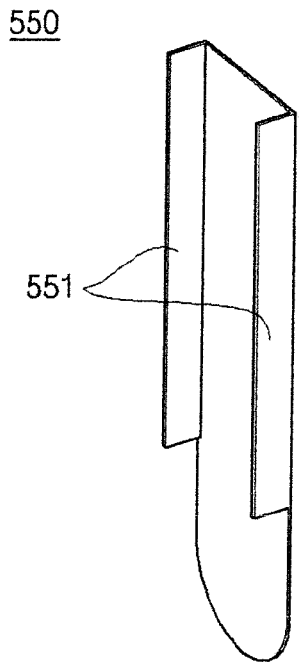
Figure 2D:
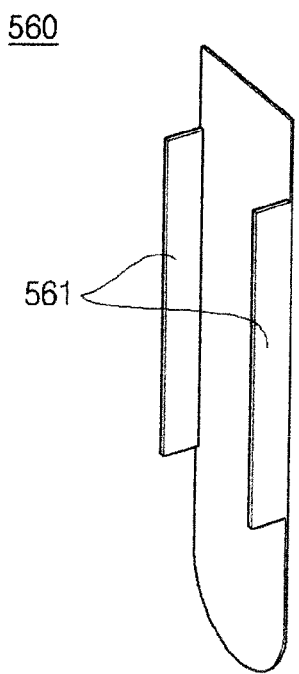

Referring now to FIG. 2a, in one exemplary embodiment, a skirt 531 may extend along parallel longitudinal edges of a cell cover 530. Referring to FIGS. 2b-2d, in other exemplary embodiments, a skirt 541, 551, 561 may extend along a portion of a longitudinal edge of a cell cover 540, 550, 560. One of ordinary skill in the art will appreciate that many configurations of skirts may be used on the cell cover without departing from the spirit and scope of the present invention.

Figure 3A:
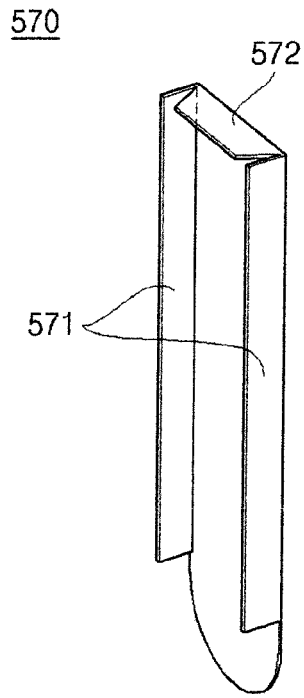
FIGS. 3a to 3d are perspective views of exemplary cell covers with a rib according to the present invention.
Figure 3B:
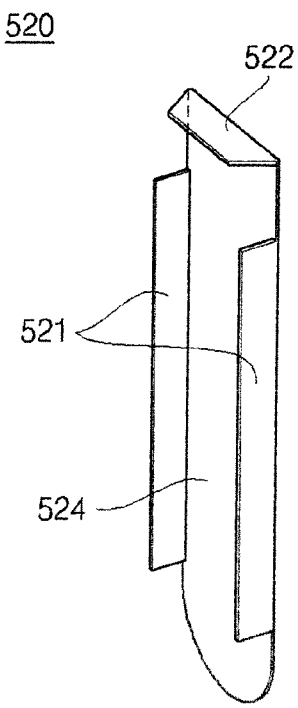
Figure 3C:
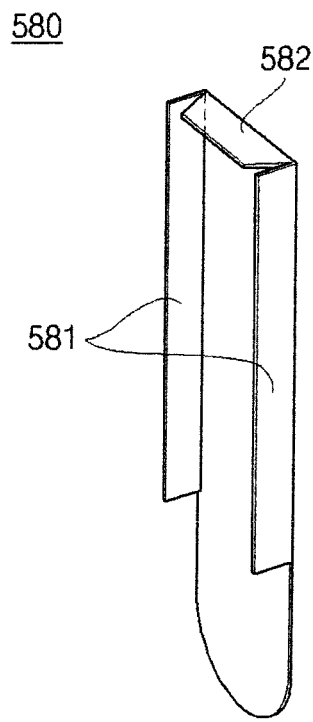
Figure 3D:
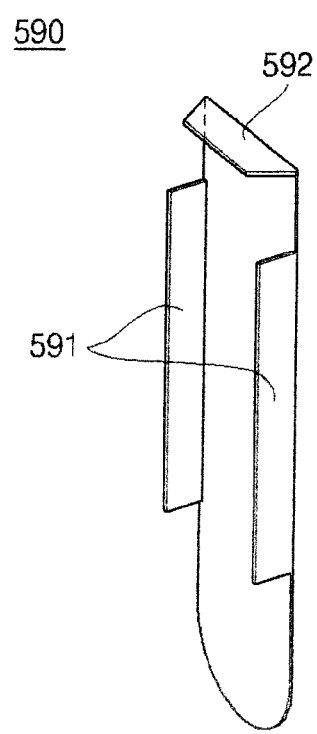

A rib 572 providing increased rigidity to a cell cover 570 may be located along a lateral edge of the cell cover extending generally perpendicular to a planar surface of the cell cover in the same direction as a skirt 571. In one exemplary embodiment, the rib 572 is integral with the cell cover 570. With reference also to FIGS. 3b-3d, ribs 522, 582, 592 may be located on cell covers 520, 580, 590 having various configurations of skirts 521, 581, 591. It will be appreciated that a rib may be incorporated into a cell cover having a variety of skirt configurations.

Referring again to FIG. 1, a rib groove 420 on the substrate cover 400 is located to receive the rib 512 on the cell cover 510 to increase the adherence between the substrate cover and the cell cover. In one exemplary embodiment, the rib groove 420 is a slot into which the rib 512 is insertable. As described in more detail below, when the rib 512 is inserted into the rib groove 420, the cell cover 510 is more securely attached to the bare cell 100.

An identifying groove 513 may be located on the cell cover 510 adapted to receive an identifier 800 such as a label, etc. The identifying groove 513 may be of any shape sufficient to receive the identifier 800. The identifying member 800 serves to differentiate the cap plate 132 from the bottom 121 of the can 120.

As noted above, the cell covers 510, 520 as described with respect to aspects of the present invention have increased adherence to the bare cell 100, and therefore are less likely to separate from the bare cell upon impact of the secondary battery without the use of exterior adherent material.

Referring to FIG. 4, the substrate cover 600 of a pack type battery may be resin molded to the bare cell 100, the PCM (not shown) and the cell cover 520. Although not shown in the drawings, the substrate cover may be injection molded using a method combining hot melt resin with a separate injector.

Hereinafter, assembly of the pack type battery according to an exemplary embodiment of the present invention will be described.

Referring to FIG. 1, the PCM 200 is installed onto the bare cell 100, and the lead plates 310, 320 connected to the PCM 200 are electrically coupled to the electrode terminal of the surface of the cap plate 132 and to the bottom 121 of the can 120, respectively.

The PCM 200 is then covered by sliding the substrate cover 400 over the PCM, and the cell covers 510, 520 are inserted onto the bare cell 100 such that the skirt 511, 521 rests on planar side surfaces of the bare cell. The cell covers 510, 520 are retained on the bare cell 100 by an adhesive 525, such as double-sided tape. The cell covers 510, 520 are configured to cover the cap plate 132 and the bottom 121 of the can 120 with the skirt 511, 521 extending over a portion of the sides of the bare cell 100. Additionally, the ribs 512, 521 may be inserted into the rib grooves 420 on the substrate cover 400 to more securely attach the cell covers 510, 520 to the bare cell 100. The label 700 having an adhesive side facing the bare cell 100 is then attached to the bare cell, covering the skirts 511, 522 of the cell covers 510, 520 and at least a portion of the sleeve 421 of the substrate cover 400. Accordingly, the cell covers 510, 520 may be attached to the bare cell by the label 700 without an additional exterior adhesive. As such, wrinkles are less likely to form on the label 700, manufacturing costs of the secondary battery are reduced, and manufacturing efficiency of the secondary battery is increased.

It will be understood by those of ordinary skill in the art that various replacements, modifications and changes to embodiments of the secondary batteries described herein may be made without departing from the spirit and scope of the present invention as defined by the following claims. Therefore, it is to be appreciated that the above described embodiments are for purposes of illustration only, and are not intended to be limiting.

What is claimed is:

1. A pack type battery, comprising:
    a bare cell comprising a top edge, a bottom edge, and opposing planar side surfaces;
    a protective circuit module electrically coupled to the bare cell by a lead plate;
    a substrate cover attached to the bare cell and covering the protective circuit module;
    a pair of elongate cell covers, each elongate cell cover of the pair of elongate cell covers comprising a base for covering one of the top edge and the bottom edge of the bare cell and a skirt extending from longitudinal edges of the base for covering a portion of the opposing planar side surfaces; and
    a label covering a portion of the opposing planar side surfaces of the bare cell and a portion of the skirt of each elongate cell cover of the pair of elongate cell covers.

2. The pack type battery of claim 1, wherein the skirt extends along only a portion of a length of the base of each elongate cell cover of the pair of elongate cell covers.

3. The pack type battery of claim 2, wherein the skirt is substantially centrally located along the length of the base.

4. The pack type battery of claim 1, wherein each elongate cell cover of the pair of elongate cell covers comprises a rib adapted to engage the substrate cover.

5. The pack type battery of claim 4, wherein the substrate cover comprises a rib groove adapted to receive the rib from one elongate cell cover of the pair of elongate cell covers.

6. The pack type battery of claim 1, wherein the substrate cover is resin molded to the bare cell and to the protective circuit module.

7. The pack type battery of claim 6, wherein the substrate cover is injection molded.

8. The pack type battery of claim 1, wherein the bare cell is a prismatic type battery.

9. The pack type battery of claim 8, further comprising an identifying mark located on the top edge of the bare cell to differentiate the top edge from the bottom edge.

10. The pack type battery of claim 1, wherein the cell cover is attached to the bare cell by an adhesive.

11. The pack type battery of claim 10, wherein the adhesive is double-side tape.

12. The pack type battery of claim 1, wherein the label is directly attached to the bare cell and to the skirt of the cell cover.

* * * * *

UNITED STATES PATENT AND TRADEMARK OFFICE
CERTIFICATE OF CORRECTION

| | |
|---|---|
| PATENT NO. | : 7,887,948 B2 |
| APPLICATION NO. | : 12/105244 |
| DATED | : February 15, 2011 |
| INVENTOR(S) | : Youngcheol Jang et al. |

Page 1 of 2

It is certified that error appears in the above-identified patent and that said Letters Patent is hereby corrected as shown below:

On the Title Page

(56) References Cited Foreign Patent Documents, right column, line 7

Delete "10-20047-0035642"
Insert -- 10-2007-0035642 --

(56) References Cited, Other Publications, page 2, right column, line 2

Delete "Jun III Yoon, et al."
Insert -- Jun Ill Yoon, et al. --

In the Drawings

Sheet 7 of 7, FIG. 5

Delete Drawing Sheet 7 and substitute therefore the Drawing Sheet consisting of FIG. 5, as shown on the attached page.

Signed and Sealed this
Seventh Day of August, 2012

David J. Kappos
*Director of the United States Patent and Trademark Office*